United States Patent Office 2,913,304
Patented Nov. 17, 1959

2,913,304

PROCESS FOR TANNING SKINS AND FURS

Rudi Heyden and Jürgen Plapper, Dusseldorf, Germany, assignors to Böhme Fettchemie G.m.b.H., Dusseldorf, Germany, a corporation of Germany No Drawing. Application July 2, 1956
Serial No. 595,050

Claims priority, application Germany July 2, 1955

8 Claims. (Cl. 8—94.33)

The present invention relates to a process for tanning skins and furs which consists of impregnating the skins or furs with water-soluble cationic synthetic resins containing lipophilic radicals, which are obtained by condensation of salts of high-molecular amines with cyanamide or its derivatives and with oxo-compounds. With the aid of these new resin tanning agents, which may be used as self-tannins or in combination with other types of tanning agents, leather is obtained which exhibits improved properties in comparison with leathers produced with the aid of known resin tanning agents, especially improved pliability and resistance to water, improved tensile strength and excellent aging and storage properties.

As the high-molecular amine starting component for the production of our novel resin tanning agents, high-molecular, preferably primary aliphatic, cycloaliphatic or aliphatic-aromatic and aliphatic-cycloaliphatic amines are used wherein the lipophilic hydrocarbon radicals contain more than 6 and preferably from 12 to 22 carbon atoms. The hydrocarbon radicals of these high-molecular amines may be straight-chain or branched-chain radicals, and may be interrupted by heteroatoms or heteroatom groups, or may also carry substituents such as hydroxyl groups, amino groups, and the like. Examples of suitable high-molecular amines are octylamine, dioctylamine, dodecylamine, octadecylamine, oleylamine, cyclohexylamine, methylcyclohexylamine, octylcyclohexylamine, and mixtures of high-molecular amines such as those produced in known fashion from fatty acid mixtures occurring in natural fats or from hydrocarbon fractions of corresponding chain lengths. The amines are preferably used in the form of water-soluble salts, for example hydrochlorides.

Derivatives of cyanamide which may be used as starting components for the production of the resin tanning agent include, for example, guanidine, dicyandiamide, melamine, urea, dicyandiamidine, and the like, as well as their derivatives. Mixtures of these materials may also be employed. For the tanning process in accordance with this invention, the synthetic resins produced from dicyandiamide are particularly suitable.

Oxo-compounds which may be used as starting components for the production of our tanning resins are primarily formaldehyde or formaldehyde-yielding substances, as well as other known aldehydes or ketones commonly employed for the production of synthetic resins.

The quantitative ratios in which the above-named starting materials are condensed with each other may vary within certain limits. It is most advantageous to employ a molar ratio of cyanamide compound to formaldehyde between 1:3 and 1:8, but preferably between 1:4 and 1:5, a portion of the cyanamide derivative component, preferably from 0.1 to 0.7 mol, is replaced by an equimolar amount of a high-molecular amine.

The resinous condensation products may be produced by simple methods—for example, by heating the starting components together in aqueous solution—but the same result may also be achieved by first condensing the formaldehyde with the cyanamide component or with the amine and then adding the third component in the course of the condensation reaction. At atmospheric pressures care should be taken to avoid heating the mixture to the boiling point, because otherwise strong foaming may occur. Temperatures from 80 to 90° C. have been found to be most advantageous. The condensation may also be carried out in a closed vessel at more elevated temperatures, but a temperature of 130° C. is preferably not exceeded. The degree of condensation may be varied by the duration of the heating step. The resin solution thus obtained is in most cases a clear, stable, viscous liquid which, in many cases, is miscible with water in any desired ratio.

The production of the above-described condensation products may also be carried out into the presence of organic solvents; suitable solvents are primarily alcohols such as methanol, ethanol, butanol, ethylhexanol, benzyl alcohol, methylcyclohexanol, tetrahydrofurfuryl alcohol, and the like, which to a certain extent take part in the condensation reaction. The properties of the resins, especially their solubilities, are influenced thereby.

For example, if methanol is used as the solvent, the resins produced in this manner are not only soluble in water but also in a number of organic compounds which include not only the usual solvents, such as alcohols or chlorinated hydrocarbons, but also such compounds as polyglycols, fatty alcohols, fatty acids and, in the presence of small amounts of fatty acids, also fatty oils. The solutions in fatty materials produce stable emulsions when admixed with water.

If a higher alcohol, such as butanol, is used as the solvent in the production of the resinous condensation products, the compounds obtained thereby are insoluble in water. Their solubility in organic substances, however, is improved over the products produced in aqueous or methanolic solutions.

The following examples will illustrate various methods of producing the resinous condensation products used for tanning leather in accordance with the present invention:

Example I 100 gm. dicyandiamide, 650 gm. of a 30% solution of the hydrochloric acid salt of a mixture of primary amines derived from coconut oil fatty acid and having a chain length of 8 to 18 carbon atoms, and 1000 gm. of a 30% formalin solution were refluxed for 6 hours at 85 to 90° C. A clear, stable resin solution was obtained which was miscible with water in any desired ratio. When this solution was spray-dried under mild conditions, a dry fluffy powder, readily soluble in water, was obtained. A dry product, readily soluble in water, was also obtained by simply evaporating the solution in vacuo.

Example II 85 gm. dicyandiamide, 800 gm. of a 30% solution of the hydrochloric acid salt of a mixture of primary amines derived from tallow fatty acid having a chain length of 14 to 18 carbon atoms, and 800 gm. of a 30% formalin solution were heated for 7 hours at 85 to 90° C. A viscous resin solution was obtained which was readily emulsifiable in water.

Example III 84 gm. dicyandiamide, 260 gm. paraformaldehyde, 240 gm. of the hydrochloric acid salt of a mixture of primary amines derived from coconut oil fatty acid and having a chain length of 8 to 18 carbon atoms, 640 gm. methanol and 80 gm. water were refluxed together at the boiling point for 6 hours. The reaction solution thus obtained was miscible with water in any desired ratio and produced heavy precipitates when admixed with anionic surface-active substances, such as water-soluble salts of alkyl sulfates and alkyl benzene sulfonates.

By evaporating the methanolic solution, a dry resin was obtained which was soluble in a number of organic solvents, such as in butanol, dioxane, polyglycol (molecular weight 300), methylcyclohexanol, perchloroethylene, fatty alcohols and fatty acids. The resin also dissolved in fatty oils when small amounts of fatty acids were present.

Example IV 55 gm. guanidine, 800 gm. of a 30% formalin solution and 244 gm. of the hydrochloric acid salt of a mixture of primary amines derived from coconut oil fatty acid and having a chain length of 8 to 18 carbon atoms were refluxed at 90 to 95° C. for 7 hours, accompanied by stirring. Subsequently, the solvent was evaporated in vacuo and a clear yellow mass was left behind.

A clear, stable resin solution was obtained which was miscible with water in any desired ratio. When this solution was spraydried under mild conditions, a dry fluffy powder, readily soluble in water, was obtained. A dry product, readily soluble in water, was also obtained by simply evaporating the solution in vacuo.

The new resin tanning agents obtained in this manner comprise basic groups and are preferably used in the form of water-soluble salts. They have a remarkable affinity for the collagen fibers and produce uniform and lasting tanning effects. In most cases it is desirable to transform the soluble resins into an insoluble form after the skins have been impregnated therewith. This transformation may be carried out by various methods. The most advantageous method comprises treating the impregnated skin with substances which combine with the resins to form insoluble compounds. Of particular interest among such substances are anion-active materials or anionic resins such as high-molecular alkyl sulfates, alkyl sulfonates, alkyl benzene sulfonates, and analogously acid-reacting vegetable or synthetic tanning agents or resin tanning agents, or their salts. However, the transformation into insoluble resins may also be accomplished by treating the impregnated skins with acids or salts so as to bring a complete condensation of the resinous material, whereby the resin becomes insoluble. Finally, the soluble resin tanning agents may also be transformed into an insoluble form by a reaction with salts of certain inorganic acids, especially salts of polymeric inorganic acids, for example with borates, phosphates or silicates.

As previously mentioned, the new resin tanning agents may advantageously be used as self-tannins, but they may also be employed together with other mineral, vegetable or synthetic tanning agents, resin tanning agents or fatty tanning agents. In conjunction with mineral, natural or synthetic tanning agents, the resinous condensation products may also be used as preliminary tanning agents. Subsequent to such preliminary tanning, the leather may be subjected to a final tanning treatment in the customary manner. Leather of remarkable fullness is obtained thereby. The novel condensation products herein described may, however, also be employed for a re-tanning treatment subsequent to a normal tanning procedure with mineral, vegetable or synthetic tanning agents. In this manner it is possible to obtain leather which possesses particularly beautiful and smooth grain structures in addition to an improved fullness.

The amounts in which the condensation resins in accordance with the present invention are used for tanning depends substantially upon the types of furs and skins being treated, upon the preliminary treatment of the raw skins or the furs prior to tanning and upon the type of leather which is to be produced thereby. In general, however, the amounts range between 2 and 10% if the resinous tanning agent is used as a self-tannin, and between 1 and 6% for combination tanning, both percentages based on the pelt weight. The preliminary treatment of the skins or furs may be carried out in the usual fashion. The skins are prepared in the beam-house by softening, liming, deliming, bating or, if desired, pickling. The leather produced in accordance with the present process not only possesses the above-described advantageous properties but is also marked by a high light-fastness, so that it is possible to produce various types of white leather with the aid of the novel resin tanning agents. It should further be emphasized that the impregnated skins dry very smoothly and readily and that skins treated with these tanning agents have, in addition, excellent staking properties.

The process in accordance with the present invention may be used for the production of the usual types of leathers from splits or animal skins, such as pig- and doeskins, lambskins, sheepskins, kid- and goatskins, calfskins, pigskins, cowhides and other bovine skins. In addition, the present process is of particular value for tanning furs of all kinds, such as foal, lamb, rabbit, and precious furs, and also for tanning reptile skins. The process is particularly advantageous for the production of soft leather, such as glove leather, billfold leather, apparel leather and suede leather.

The following examples will further illustrate the tanning process according to the present invention and enable other persons skilled in the art to understand our invention more completely. It is understood, however, that the invention is not limited to the particular materials and conditions recited in these examples.

The percentages mentioned in the examples are based upon the pelt weight.

Example V

Delimed and bated calfskins (pH 7.0 to 7.5) were tanned with a solution containing 100% (based on dry matter) of water, at a temperature between 18 and 20° C., and 10% (based on dry matter) of a resin solution produced by heating 50.5 parts by weight of dicyandiamide, 325 parts by weight of a 30% solution of coconut oil amine hydrochloride and 500 parts by weight of a 30% formalin solution (molar ratio 0.6:0.4:5.0) at 85° C. to 90° C. for about 7 hours. The skins were left in the solution for about 3 hours. Subsequently, the solution was acidified with an 85% solution of formic acid until the pH of the solution was about 6.0 to 6.5. Thereafter the skins were allowed to remain in the acidified solution for an additional 5 to 10 minutes and were then dried on the horse overnight. The next day the dry tanned leather was fat-liquored with a fat-liquoring agent containing 2 to 3% of a commercial fat-liquoring oil. The tanned leather was then finished in the usual fashion. A white, soft, light-fast leather was obtained.

Example VI

Pickled and degreased sheepskins were tanned with a solution containing 100% (based on dry matter) of water, at about 20° C., and 4 to 5% (based on dry matter) of a resin solution produced by heating 42 parts by weight dicyandiamide, 400 parts by weight of a 30% solution of coconut oil amine hydrochloride, and 400 parts by weight of a 30% formalin solution (molar ratio 0.5:0.5:4.0) to 85 to 90° C. for 7 hours. The skins were allowed to remain in this solution for about 3 hours. Thereafter the solution was neutralized with about 0.2 to 0.3% ammonia and the skins were allowed to remain in this neutralized solution for about 1 additional hour.

Subsequently, the skins were transferred to and treated in the following solution: 40% water, at about 20° C., 8% of a 50% Ocenol (octadecenyl alcohol) sodium sulfate paste and 0.2% of an 85% solution of formic acid. The skins were allowed to remain in this solution for about 2 hours. Thereafter 2% potassium alum and 2% common salt were added to the solution while rotating the vat. The skins were allowed to remain in this modified solution for about 2 hours. The leather was then removed from the vat, horsed up for 2 days and finally rinsed for a short period of time.

The leather was then neutralized for 30 minutes with the following solution: 100% water, at about 30° C., and 0.2 to 0.3% sodium bicarbonate. Thereafter the neutralized leather was rinsed for about 10 minutes and immediately hung up to dry without wringing, treated with sawdust and staked. The leather thus obtained was white, soft and light-fast and excellently suited for use in kid gloves, billfolds and apparel.

*Example VII*

To a solution containing 100 parts by weight concentrated hydrochloric acid and 250 parts by weight water, 203 parts by weight coconut oil amine were slowly added, accompanied by stirring. Within half an hour 41 parts by weight of a 40% formalin solution were added dropwise to the solution at 95° C., and the entire mixture was then heated to the boiling point for 3 hours. Thereafter 20 parts of a 10% sodium hydroxide solution were added and finally 200 parts by weight of a hot 23.5% cyanamide solution were added. After about 2 hours of additional heating, the solution was filtered. A clear resin solution was obtained which was miscible with water in any desired ratio. This resin solution was used in the same manner for tanning leather as the synthetic resins produced in accordance with Examples V and VI, and produced substantially similar results.

*Example VIII*

Delimed and bated cow- or sheephides (pH 7.0 to 7.5) were tanned with the following solution: 100% (based on dry matter) of water, at about 20° C., and 2 to 4% of the resinous condensation product described in Example V. The skins were allowed to remain in this solution for about 3 hours. Thereafter they were transferred to a second solution containing about 1.5% chromium oxide (commercial basic chrome tanning agent). The tanned skins were then finished in the usual manner. The type of leather obtained thereby was particularly suitable for use in apparel and gloves and was marked by its smooth grain and excellent fullness.

*Example IX*

Delimed and bated sheepskins (pH 7.0 to 7.5) were tanned with the following solution: 100 to 150% (based on dry matter) of water, at about 20° C., and 4% of the resinous condensation product described in Example VI. The skins were allowed to remain in this solution for about 2 hours. Thereafter the tanned skins were removed from the solution and horsed up overnight. The next day they were impregnated with a solution containing 100 to 150% water, at about 20° C., and 0.5% of a 30% formaldehyde solution for about 2 hours. The next day the skins were immersed in a solution containing 100 to 150% water, at about 20° C., and 0.5 to 2% hexametaphosphate for 2 hours. After removing the skins from this solution and allowing them to dry from 1 to 2 days, they were fat-liquored with 3 to 4% of a commercial liquoring oil in the usual manner. A white, soft, light-fast leather was obtained which was excellently suited for use in the manufacture of leather apparel and gloves.

While we have illustrated certain specific embodiments of our invention, we wish to emphasize that the present invention is not limited to such embodiments, and that various changes and modifications may be made without departing from the spirit of the invention or the scope of the appended claims.

We claim:

1. The process of tanning animal skins and furs which comprises impregnating said skins and furs with a solution of a water-soluble cationic resinous condensation product produced by a condensation reaction between a water soluble salt of an amine selected from the group consisting of alkyl amines, and alkyl cycloalkyl amines, said amines containing from 8 to about 22 carbon atoms, a cyanamide derivative selected from the group consisting of cyanamide, guanidine, dicyandiamide, melamine, urea, and dicyandiamidine and an oxo-compound selected from the group consisting of lower alkanals and paraformaldehyde, said cyanamide derivative and said amine being present in a molar ratio of from 0.9:0.1 to 0.3:0.7 and said cyanamide derivative and said amine together being present in a molar ratio with said oxo-compound of from 1.0:3.0 to 1.0:8.0 and drying said tanned furs and skins.

2. The process of claim 1 wherein said cyanamide derivative is cyanamide.

3. The process of claim 1 wherein said cyanamide derivative is dicyandiamide.

4. The process of tanning animal skins and furs which comprises impregnating said skins and furs with a solution of a water soluble cationic resinous condensation product produced by a condensation reaction between dicyandiamide, formaldehyde and a water soluble salt of an alkyl amine containing about 12 to about 22 carbon atoms, said dicyandiamide and said amine being present in a molar ratio of from 0.5:0.5 to 0.6:0.4, and said dicyandiamide and said amine together being present in a molar ratio with said formaldehyde of from 1.0:4.0 to 1.0:5.0 and drying said tanned furs and skins.

5. The process of tanning animal skins and furs which comprises impregnating said skins and furs with a solution of a water-soluble cationic resinous condensation product produced by a condensation reaction between a water soluble salt of an amine selected from the group consisting of alkyl amines, and alkyl cycloalkyl amines, said amines containing from 8 to about 22 carbon atoms, a cyanamide derivative selected from the group consisting of cyanamide, guanidine, dicyandiamide, melamine, urea and dicyandiamidine and an oxo-compound selected from the group consisting of lower alkanals and paraformaldehyde said cyanamide derivative and said amine being present in a molar ratio of from 0.9:0.1 to 0.3:0.7 and said cyanamide derivative and said amine together being present in a molar ratio with said oxo-compound of from 1.0:3.0 to 1.0:8.0, whereby a portion of said soluble resin and collagen interact and transforming the remainder of said soluble resin deposited in the skins and the furs into a water-insoluble form by reacting said deposited cationic resinous condensation product in situ with an anion-active compound selected from the group consisting of higher alkyl sulfates, higher alkyl sulfonates and alkyl benzene sulfonates, and drying said tanned furs and skins.

6. The process of claim 5 wherein said cyanamide derivative is cyanamide.

7. The process of claim 5 wherein said cyanamide derivative is dicyandiamide.

8. The process of tanning animal skins and furs which comprises impregnating said skins and furs with a solution of a water soluble cationic resinous condensation product produced by a condensation reaction between dicyandiamide, formaldehyde and a water soluble salt of an alkyl amine containing about 12 to about 22 carbon atoms, said dicyandiamide and said amine together being present in a molar ratio of from 0.5:0.5 to 0.6:0.4 and said dicyandiamide and said amine together being present in a molar ratio with said formaldehyde of from 1.0:4.0 to 1.0:5.0, whereby a portion of said soluble resin and collagen interact and transforming the remainder of said soluble resin deposited in the skins and furs into a water-insoluble form by reacting said deposited cationic resinous condensation product in situ with an anion-active compound selected from the group consisting of higher alkyl sulfates, higher alkyl sulfonates and alkyl benzene sulfonates, and drying said tanned furs and skins.

References Cited in the file of this patent

UNITED STATES PATENTS

| | | |
|---|---|---|
| 2,423,185 | Gundel | July 1, 1947 |
| 2,516,283 | Winheim | July 25, 1950 |
| 2,516,284 | Winheim | July 25, 1950 |
| 2,550,638 | Dawson | Apr. 24, 1951 |
| 2,621,102 | Nagy | Dec. 9, 1952 |